United States Patent

Vargiu et al.

[11] 3,911,048
[45] Oct. 7, 1975

[54] PROCESS FOR THE CONTINUOUS PREPARATION OF UNSATURATED POLYESTERS

[75] Inventors: Silvio Vargiu, Sesto S. Giovanni (Milan); Beppino Passalenti; Ugo Nistri, both of Milan, all of Italy

[73] Assignee: Societa' Italiani Resine S.I.R. S.p.A., Milan, Italy

[22] Filed: Nov. 29, 1973

[21] Appl. No.: 420,348

[30] Foreign Application Priority Data
Nov. 30, 1972  Italy.................... 32278/72

[52] U.S. Cl........... 260/861; 260/75 M; 260/75 UA
[51] Int. Cl.² ................. C08G 63/22; C08G 65/52
[58] Field of Search............ 260/75 M, 75 UA, 861

[56] References Cited
UNITED STATES PATENTS
3,252,941  5/1966  Mayer et al.................. 260/75

OTHER PUBLICATIONS
Kirk–Othmer, Encyclopedia of Chemical Technology, 2nd Ed; V. 20, 800 (1968).

Primary Examiner—Howard E. Schain
Assistant Examiner—W. C. Danison, Jr.
Attorney, Agent, or Firm—Sughrue, Rothwell, Mion, Zinn & Macpeak

[57] ABSTRACT

Process for the continuous preparation of unsaturated polyesters, comprising bringing olefinically unsaturated dicarboxylic acids or their anhydrides, if desired, together with saturated dicarboxylic acids of their anhydrides (dicarboxylic acid component) and dihydric alcohols, if desired, together with higher polyhydric alcohols (alcohol component) into contact in molar ratios of from about 1.5:1 to 1.95:1 in a first reaction phase, operating at a temperature of from about 100° to 160°C and with residence times of from about 5 to 40 minutes to cause the formation of a corresponding half-ester; adding to the half-ester formed a further quantity of the alcohol component in such a way as to give a molar ratio of the dicarboxylic acid component to the total amount of the alcohol component in the range of from about 0.87:1 to 0.97:1; bringing about the polyesterification in a second reaction phase by treating the product obtained in at least two separate and successive stages, which are operated at decreasing pressure values in the range of from about 5 atmospheres to atmospheric pressure, for times of about 2 to 8 hours, and at temperatures of from about 100° to 220°C, the temperature in said stages not differing by more than about 10°C, and the water formed during the polyesterification being eliminated from each of the said stages; evaporating the residual water and the excess of the alcohol component from the polyesterification product obtained with operation at pressures below atmospheric pressure.

10 Claims, 1 Drawing Figure

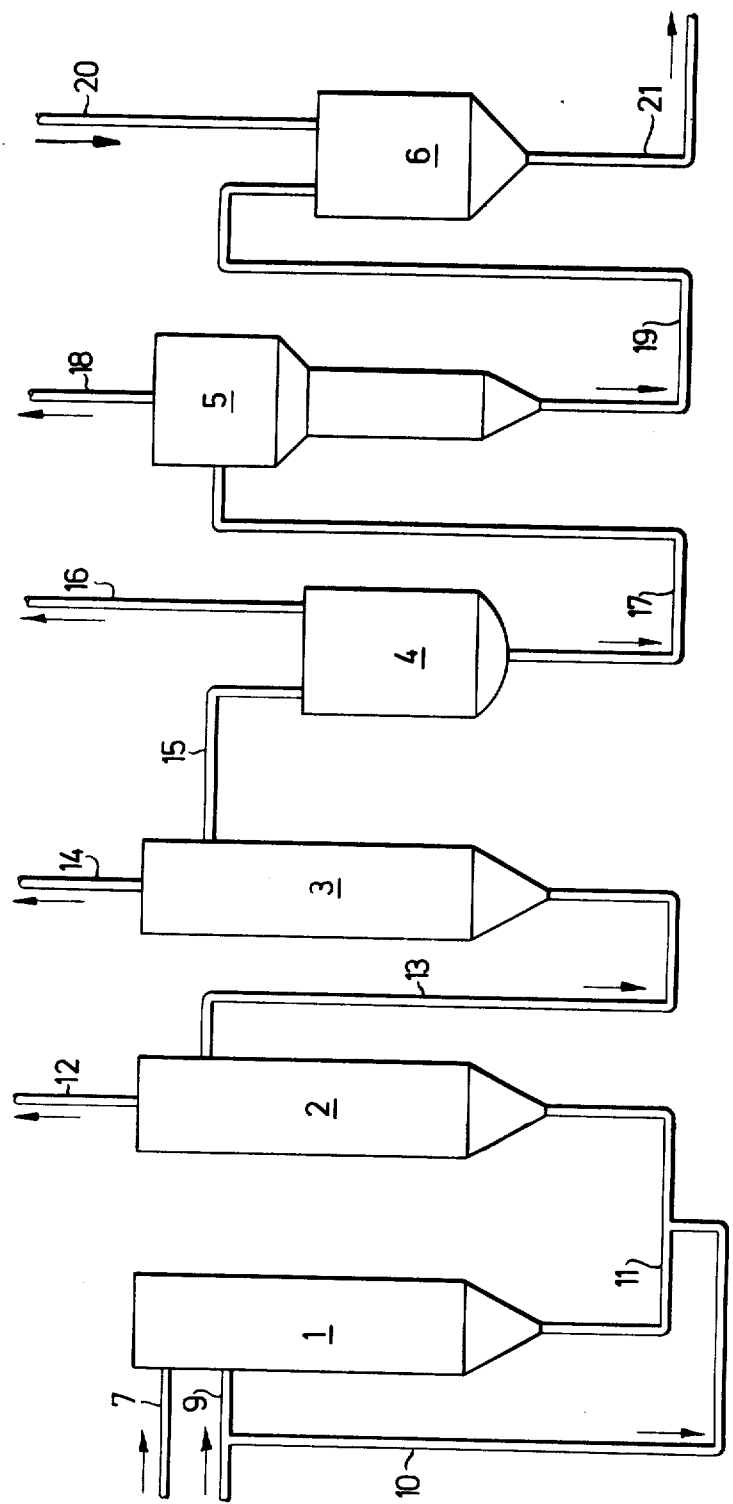

3,911,048

PROCESS FOR THE CONTINUOUS PREPARATION OF UNSATURATED POLYESTERS

BACKGROUND OF THE INVENTION

1. Field of the Invention

The present invention relates to a continuous process for the preparation of unsaturated polyesters.

Unsaturated polyesters are a class of soluble, essentially linear, low molecular weight macromolecules which contain both carboxylic ester groups and carbon-carbon double bonds as recurring units along the main chain. These unsaturated polyesters are usually prepared by condensation of (a) ethylenically unsaturated dicarboxylic acids or their anhydrides to impart the unsaturation, (b) saturated dicarboxylic acids or their anhydrides to modify the unsaturated polyesters and (c) dihydric alcohols. Unsaturated polyesters are diluted to liquid mixtures with reactive diluents such as styrene, methyl methacrylate or other polymerizable monomeric acrylic or vinyl compounds. These liquid mixtures are hereinafter termed as unsaturated polyester resins. These mixtures can be cured in the presence of polymerization initiators to produce crosslinked strong solids. Both in the manufacture and use of unsaturated polyesters it is necessary that the formulation contain free radical inhibitors; cf. Kirk-Othmer, Encyclopedia of Chemical Technology, Second Edition, Vol. 20 (1969), pp. 791 to 839 and Encyclopedia of Polymer Science and Technology, Vol. 11 (1969), pp. 129 to 168.

2. Description of the Prior Art

In normal practice, in the batchwise preparation of unsaturated polyesters the reactants comprising the ethylenically unsaturated dicarboxylic acid or its anhydride, a saturated dicarboxylic acid or its anhydride and a dihydric alcohol are heated for about 6 to 20 hours to temperatures of from about 180° to 230°C. For the removal of water formed during the esterification the mixture is sparged with an inert gas. It is also possible to add to the mixture a solvent such as xylene which together with the formed water forms an azeotropic mixture which is distilled off. This measure is, however, seldom used in practice since it causes additional costs and difficulties in removing the last traces of solvent from the unsaturated polyester.

Apart from the long reaction time the discontinuous operation has the disadvantage that one almost never obtains complete reproducibility of the results and hence absolute constancy of the characteristics of the products.

A need was therefore felt for the manufacture of unsaturated polyesters by a continuous operation which gives reproducible results. A continuous process normally gives a higher yield per time unit and per unit of the effective volume of the reactor, a greater possibility of automation of the plant, and a greater constancy of the characteristics of the product than a discontinuous process.

In principle, the manufacture of unsaturated polyesters can be carried out in a continuous operation by feeding the reactants to the one end of a reaction zone having an elongated, e.g. tubular shape and being maintained at elevated temperature. In this reaction zone the residence time of the reactants is controlled so that the reaction is carried to completion. The products are discharged at the other end of the reaction zone. It is found in practice that the conventional continuous processes have various disadvantages. For example, no suitable means have been found for the immediate removal of the water formed during esterification. It is well known that water is undesirable in an esterification reaction, since it tends to cause the reverse reaction to the esterification and so acts in practice as an inhibitor of the reaction.

Moreover, it has not so far been possible to prepare unsaturated polyesters by continuous operation with the use of conventional techniques and equipment. When the reacting mass is maintained by the normal means of heat exchange at the high temperatures required in the phase in which the completion of the reaction occurs and for the times required for this completion, gelation in the mass and progressive deposition of the gelled mass inside the reactor may occur. These deposited materials can be removed only by stopping the equipment and washing with solvents or scraping. On the other hand, if the deposits are allowed to accumulate, the efficiency of the heat exchange progressively decreases and the effective volume of the equipment is also reduced.

It is though that one reason for the lack of success in the preparation of unsaturated polyesters by a continuous process lies in the fact that the temperature was raised as the polyesterification reaction proceeded in the same way as in discontinuous execution.

SUMMARY

One object of the invention is to provide a simple and convenient process for the continuous preparation of unsaturated polyesters, wherein the water thus formed is removed immediately and no deposits are formed in the reaction zone. Further objects will be apparent from the following description.

The invention consists essentially in carrying out the polyesterification reaction by continuous operation via several reaction stages in series with one another, in which the same temperature or approximately the same temperature is maintained, a pressure that progressively decreases from values of a few atmospheres to atmospheric pressure being maintained in these stages.

Moreover, elimination of the polyesterification water occurs in each of the said stages, the elimination taking place under the particular conditions of temperature and pressure used.

More particularly, according to the process of the present invention:

The formation of a half-ester is carried out in a first reaction phase by reaction of an ethylenically unsaturated dicarboxylic acid or its anhydride and a saturated dicarboxylic acid or its anhydride with a quantity of a dihydric alcohol smaller than that theoretically necessary for the formation of the unsaturated polyester.

A further quantity of dihydric alcohol is added to the half-ester obtained in this way and the mixture is subjected to polyesterification in a second reaction phase via several stages maintained at the same temperature or approximately the same temperature and at a pressure decreasing from a few atmospheres to atmospheric pressure. The number of the said stages is at least two, and elimination of polyesterification water occurs in each of these.

The residual water and any excess of the dihydric alcohol are then eliminated from the polyesterification product obtained in this way, the operation being carried out at a pressure below atmospheric pressure by a rapid distillation technique.

DESCRIPTION OF THE PREFERRED EMBODIMENTS

According to a preferred embodiment of the process of the present invention unsaturated polyesters are prepared by a. bringing olefinically unsaturated dicarboxylic acids or their anhydrides, if desired, together with saturated dicarboxylic acids or their anhydrides (dicarboxylic acid component) and dihydric alcohols, if desired, together with higher polyhydric alcohols (alcohol component) into contact in molar ratios of from about 1.5:1 to 1.95:1 in a first reaction phase, operating at a temperature of from about 100° to 160°C and with residence times of from about 5 to 40 minutes to cause the formation of a corresponding half-ester;

b. adding to the half-ester formed a further quantity of the alcohol component in such a way as to give a molar ratio of the dicarboxylic acid component to the total amount of the alcohol component in the range of from about 0.87:1 to 0.97:1;

c. bringing about the polyesterification in a second reaction phase by treating the product obtained in b) in at least two separate and successive stages, which are operated at decreasing pressure values in the range of from about 5 atmospheres to atmospheric pressure, for times of from about 2 to 8 hours, and at temperatures of from about 100° to 220°C, the temperature in said stages not differing by more than about 10°C, the water formed during the polyesterification being eliminated from each of the said stages;

d. evaporating the residual water and the excess of the alcohol component from the polyesterification product obtained in c) with operation at pressures below atmospheric pressure.

In the specification and claims the dicarboxylic acid component denotes the ethylenically unsaturated dicarboxylic acid and/or its anhydride which contains, if desired, a saturated dicarboxylic acid and/or its anhydride and the term alcohol component denotes the dihydric alcohol which contains, if desired, a higher polyhydric alcohol.

In the attached FIG. 1, the reference 1 denotes the reactor in which the formation of the half-ester occurs. The ethylenically unsaturated dicarboxylic acid or its anhydride, if desired, together with a saturated dicarboxylic acid or its anhydride (dicarboxylic acid component) is fed continuously into reactor 1, which is fitted with a stirrer, through the pipe 7.

The dihydric alcohol, if desired, together with a higher polyhydric alcohol (alcohol component) is fed through the pipe 8 and partly introduced into reactor 1 throught the pipe 9, the remainder being fed to reactor 2 throught the pipe 10. In particular, the conditions are adjusted in such a way as to ensure in the reactor 1 a molar ratio of the dicarboxylic acid component to the alcohol component of about 1.5:1 to 1.95:1. Moreover, a temperature of from about 100° to 160°C is maintained in the reactor 1, with a residence time of from about 5 to 40 minutes. During the formation of the half-ester, one normally operates at atmospheric pressure and no elimination of any component from the reaction space occurs.

The half-ester is discharged from the reactor 1 through the pipe 11 and is mixed with a further quantity of the alcohol component in such a way as to ensure a molar ratio of the dicarboxylic acid component to the alcohol component of about 0.87:1 to 0.97:1.

According to the process of the present invention, the polyesterification phase is carried out via several reaction stages. In particular, the number of such stages should be at least 2, and may have high values, e.g. up to 10. In practice, however, it has been found that it is convenient to use 3 or 4 reaction stages.

According to an essential aspect of the present invention, the polyesterification is carried out by operating at pressures that progressively decrease in the various stages from a value of a few atmospheres to atmospheric pressure. The pressure can thus vary from about 5 atmospheres in the first stage to 1 atmosphere in the last stage. It has been found in practice that it is preferably to operate at maximum pressure values of about 3 to 4 atmospheres.

According to another essential aspect of the process of the present invention, the same temperature or approximately the same temperature is maintained in each stage of the polyesterification, this temperature possibly having values in the range of from about 100° to 220°C. In practice, when it is stated that the same temperature or approximately the same temperature is maintained, it is meant that the difference between the maximum value and the minimum value of the temperature in the various stages of the polyesterification does not exceed about 10°C.

Moreover, according to the process of the present invention, the water formed in the polyesterification is eliminated from each individual stage of the second reaction phase under the conditions of temperature and pressure used. The total residence time of the mixture of the reactants under the polyesterification conditions is chosen in such a way as to reach a conversion degree of the reactants of about 0.80:1 to 0.85:1, where the conversion degree means the molar ratio of the dicarboxylic acid component that has reacted to the dicarboxylic acid fed in. Residence times suitable for the purpose vary from about 2 to 8 hours, depending on the chosen temperatures and the nature of the reactants.

A preferred embodiment of the present invention, in which the polyesterification is carried out in three stages, is illustrated in FIG. 1. More particularly, the reacting mixture is passed through the reactors 2, 3, and 4 in succession, the feed taking place through the pipes 11, 13, and 15, respectively. The polyesterification water is eliminated from the individual reactors through the pipes 12, 14, and 16. The reactors 2, 3, and 4 are also fitted with stirrers and means of heat exchange. The polyesterification product discharged from the reactor 4 is fed through the pipe 17 to the evaporator 5. In said evaporator, which preferably operates by the thin film technique, the residual water and excess alcohol component are eliminated, the operation being carried out at a pressure below atmospheric pressure, preferably from about 2 to 50 mmHg. The evaporator 5 is preferably operated at temperatures not exceeding the polyesterification temperatures. The polyesterification product discharged from the evaporator 5 is fed through the pipe 19 to the container 6, into which a monomeric acrylic or vinyl compound may be fed through the pipe 20. The unsaturated polyester resin, which contains the monomeric acrylic or vinyl compound, preferably styrene, in a quantity of from about 20 to 60 percent by weight, is discharged through the pipe 21.

The unsaturated dicarboxylic acids or their anhydrides used for the purposes of the present invention are those normally used in the art, such as maleic acid and its anhydride, itaconic and fumaric acid. Generally, maleic acid or maleic acid anhydride are used, and a part thereof is replaced by a saturated dicarboxylic acid or its anhydride, such as succinic acid and its anhydride, sebacic acid, phthalic acid and its anhydride, and isophthalic, terephthalic, or adipic acid. Small quantities of monocarboxylic acids or their anhydrides may also be present in the reaction mixture.

The alcohol components that can be used for the purpose are normally dihydric alcohols, such as 1,2-propylene glycol, ethylene glycol, diethylene glycol, triethylene glycol, butylene glycol, 1,6-hexandeiol, dipropylene glycol, and neopentyl glycol. A part of the dihydric alcohol may be replaced by higher polyhydric alcohols having three, four or five or more hydroxyl groups per molecule; cf. Ullmanns Encyclopadie der technischen Chemie, Third Edition, Vol. 14 (1963), p. 90.

The unsaturated polyesters prepared according to the invention may be blended with conventional polymerizable monomeric acrylic or vinyl compounds. Examples of these so-called reactive diluents are given in Kirk-Othmer, Encyclopedia of Chemical Technology, Second Edition, Vol. 20 (1969), pp. 816 to 822 and in Encyclopedia of Polymer Science and Technology, Vol. 11 (1969), pp. 153 to 164.

The process of the present invention is particularly useful for the preparation of unsaturated polyesters in which phthalic anhydride, maleic anhydride, and 1,2-propylene glycol are polyesterified. These unsaturated polyesters are characterized by especially favourable properties and are particularly suitable for preparing unsaturated polyester resins which contain styrene as monomeric vinyl compound.

This preferred embodiment will be illustrated, again with reference to the attached FIG. 1.

Maleic anhydride and phthalic anhydride are fed to the reactor 1 through the pipe 7 in a molar ratio of from about 1:2 to 2:1. 1,2-Propylene glycol is fed to the reactor through the pipe 9 in such amounts that the molar ratio of the dicarboxylic acid anhydrides to 1,2-propylene glycol is of from about 1.5:1 to 1.9:1. The reactor 1 is heated to temperatures of about 100° to 120°C at atmospheric pressure, with a residence time of about 5 to 20 minutes. A product having an acid value of from about 270 to 300 is obtained.

The half-ester obtained in this way is discharged from the reactor 1 through the pipe 11, and a further quantity of 1,2-propylene glycol is added in such a way as to give a molar ratio of the dicarboxylic acid anhydrides to the 1,2-propylene glycol of from about 0.80:1 to 0.97:1. This mixture is then fed to the reactor 2, which is operated at about 190° to 210°C, at pressures of about 3 to 4 atmospheres, and with a residence time of about 20 to 80 minutes. Operating under these conditions, a product having an acid value of about 130 to 140 and a density of about 1.23 to 1.30 at 100°C is fed to the reactor 3 through the pipe 13. The reactor 3 is operated at about 190° to 210°C, at about 1.8 to 2.0 atmospheres, and with a residence time of about 20 to 70 minutes. Operating in this way, the product discharged from the reactor 3 has an acid value of about 90 to 100 and a Gardner viscosity at 25°C of G-J when the said viscosity is measured in 70 percent solution in toluene. The product obtained in this way is led through the pipe 15 to the reactor 4, which is operated at atmospheric pressure. This reactor is also operated at temperatures of about 190° to 210°C, the residence time being about 30 to 50 minutes. The polyesterification water is eliminated from reactors 2, 3, and 4 through the pipes 12, 14, and 16, respectively.

The product discharged at the base of the reactor 4 is fed through the pipe 17 to a thin film evaporator 5, which is operated at temperatures of from about 190° to 220°C and at pressures of from about 2 to 30 mmHg. In this way, the residual water and the excess 1,2-propylene glycol, as well as byproducts of the reaction, are eliminated through the pipe 18.

The unsaturated polyester obtained having an acid value of about 40 to 50 and a Gardner viscosity of T-W measured in 70 percent solution in toluene is finally led through the pipe 19 to the container 6, into which styrene is also fed through the pipe 20. The container 6 is operated at about 50° to 60°C, and the unsaturated polyester is discharged through the pipe 21.

The process of the present invention is first of all simple and economically convenient, and furthermore, conventional equipment is required. The reactors suitable for the purpose consist of cylindrical steel reactors fitted with stirrers, manometers for the measurement of the pressure, valves for the regulation of the pressure, and pumps for the transport of the fluid.

By operating in the manner described, one avoids any gelation phenomenon in the reacting mass. It is thought that the particularly favourable results obtainable by the process of the present invention are due at least in part to the particular method of carrying out the polyesterification phase. Because of the easy elimination of water, short residence times are possible, and this enables products having low viscosity values and improved colour to be obtained.

Operation in the manner described probably avoids the occurrence of reactions involving the ethylenic double bonds during the polyesterification. Finally, the unsaturated polyesters of the present invention after diluting them with conventional polymerizable monomeric acrylic or vinyl compounds, harden under the influence of conventional polymerization initiators, accelerators and promotors to give products having excellent mechanical and physico-chemical characteristics.

The invention is further illustrated by the following non-limiting examples.

EXAMPLE 1

With reference to the attached FIG. 1, phthalic anhydride and maleic anhydride are introduced into the reactor 1 through the pipe 7. 1,2-Propylene glycol is introduced through the pipe 8. The feeds, which are carried out continuously, are adjusted to give a molar ratio phthalic anhydride:maleic anhydride: 1,2-propylene glycol of 1:1:2.08. In particular, 60 percent of the 1,2-propylene glycol is fed to the reactor 1 through the pipe 9, the remaining part being passed through the pipe 10. In the reactor 1, the formation of the half-ester is carried out at 110°C, at atmospheric pressure, and with a residence time of 15 minutes. The product discharged at the base of the reactor 1, which has an acid value of 290, is mixed with the 1,2-propylene glycol fed through the pipe 10 and introduced into the reactor 2, which is operated at 3.3 atmospheres, at 205°C, and with a residence time of 70 minutes. The esterification water is eliminated from the reactor 2 through the pipe 12, and a product with an acid value of 140 and a density of 1.27 measured at 100°C is recovered. This product is fed to the reactor 3, which is operated at 205°C, at 1.9 atmospheres, and with a residence time of 60 minutes. The polyesterification water is eliminated from the reactor 3 through the pipe 14, and a product having an acid value of 100 and a Gardner viscosity of I, measured at 25°C in 70 percent solution in toluene, is discharged from the reactor. This product is discharged from the reactor 3 and fed through the pipe 15 to the reactor 4, which is operated at normal pressure, at 205°C, and with a residence time of 30 minutes, and then to the thin-film evaporator 5. The evaporator is operated at 205°C and at 50 mmHg, and a product having an acid value of 50 and a Gardner viscosity of V, measured in the usual manner, is discharged at the base and fed into the container 6 through the pipe 19. Dilution is finally carried out with styrene in the container 6, the quantity of styrene being 35 parts by weight per 100 parts by weight of the unsaturated polyester. The styrene contains p-tert.-butylhydroquinone as inhibitor. The unsaturated polyester resin obtained in this way has the characteristics summarized in Table 1. In particular, the viscosity is determined with a Holde-Ubbelohde viscometer at 25°C. The gel time is determined at 25°C. 0.2 ml of a 6 percent solution of cobalt octoate in toluene/xylene (1:1) are added to 100 grams of the unsaturated polyester resin. The components are mixed and heated to 25°C. The mixture is kept in a thermostated bath and 1.5 ml of a 50 percent solution of methyl ethyl ketone peroxide in dimethylphthalate are added and thoroughly mixed. Gelation has occurred when the unsaturated polyester resin, on being touched with a glass rod, does no longer stick to the glass rod. The time that has elapsed since the addition of the peroxide is defined as the gel time. The S.P.I. gel time is determined by the S.P.I. method; cf. Kirk-Othmer, Encyclopedia of Chemical Technology, Second Edition, Vol. 20 (1969), pp. 808 to 809. For determining the storage life the unsaturated polyester resin is subjected to an accelerated test. 50 grams of the polyester resin are filled into a tube which is then closed and heated to 65°C. The fluidity of the polyester resin is observed every 24 hours. When 50 percent of the resin has gelled, the time is taken in days.

The solubility in styrene is determined by adding increasing quantities of styrene to 10 grams of unsaturated polyester, the operation being carried out at 20°C.

EXAMPLE 2

The procedure of Example 1 is followed, phthalic anhydride, maleic anhydride and 1,2-propylene glycol being reacted in a molar ratio of 1:0.7:1.83.

With reference to FIG. 1, 50 percent of the 1,2-propylene glycol is fed into reactor 1, the remainder being fed into reactor 2. With operation as in the first example, a product having an acid value of 136 and a density of 1.25 at 100°C is discharged from the reactor 1, a product having an acid value of 95 and a Gardner viscosity of H measured at 25°C in 70 percent solution in toluene is discharged from the reactor 3, and finally a product having an acid value of 45 and a Gardner viscosity of U measured in the usual manner is discharged from the evaporator 5. The unsaturated polyester obtained is diluted with styrene as in Example 1, and the unsaturated polyester resin has the characteristics summarized in Table 1.

EXAMPLE 3

The procedure of Example 1 is followed, phthalic anhydride, maleic anhydride, and 1,2-propylene glycol being reacted in a molar ratio of 1:0.5:1.62. 50 percent of the 1,2-propylene glycol is introduced into the reactor 1, the remainder being introduced into the reactor 2. With operation as in the first example, a product with an acid value of 270 is discharged from the reactor 1, a product with an acid value of 132 and a density of 1.23 at 100°C from the reactor 2, a product with an acid value of 90 and a Gardner viscosity of G, measured at 25°C and in 70 percent solution in toluene, from the reactor 3, and finally a product with an acid value of 42 and a Gardner viscosity of $T_2^1$, measured in the usual manner, is discharged from the evaporator 5. The unsaturated polyester obtained is diluted with styrene as in Example 1, and the unsaturated polyester resin has the characteristics summarized in Table 1.

COMPARATIVE EXAMPLE 1

Phthalic anhydride, maleic anhydride, and 1,2-propylene glycol are introduced in a molar ratio of 1:1:2.08 into a flask fitted with a condenser, a stirrer, a thermometer, and a sparge for the introduction of inert gas. The mixture is polymerized at temperatures from 160° to 200°C, with introduction of nitrogen and with elimination of the reaction water, until an unsaturated polyester with an acid value of 27.4 is obtained. The product is finally diluted with styrene in a quantity of 35 parts by weight per 100 parts by weight of the unsaturated polyester. The unsaturated polyester resin obtained in this way has the characteristics summarized in Table 1.

COMPARATIVE EXAMPLE 2

The procedure of Comparative Example 1 is followed, phthalic anhydride, maleic anhydride, and 1,2-propylene glycol being reacted in a molar ratio of 1:0.7:1.83. The unsaturated polyester obtained has an acid value of 26.4. The product is finally diluted with styrene in a quantity of 35 parts by weight per 100 parts by weight of the unsaturated polyester. The unsaturated polyester resin has the characteristics summarized in Table 1.

COMPARATIVE EXAMPLE 3

The procedure of Comparative Example 1 is followed, phthalic anhydride, maleic anhydride, and 1,2-propylene glycol being reacted in a molar ratio of 1:0.5:1.62. The unsaturated polyester obtained has an acid value of 27.2. The product is finally diluted with styrene in a quantity of 35 parts by weight per 100 parts by weight of the unsaturated polyester. The unsaturated polyester resin has the characteristics summarized in Table 1.

The unsaturated polyester resins prepared in accordance with Examples 1 to 3 and Comparative Examples 1 to 3 are cured. 0.2ml of 6 percent solution of cobalt octoate in toluene/xylene (1:1) and 1.5 ml of a 50 percent solution of methy ethyl ketone peroxide in dimethylphthalate are added to 100 grams of the unsaturated polyester resin and thoroughly mixed. The mixture is heated to 25°C. The following characteristics are determined on the specimens:

A) flexural strength, kg/cm² (ASTM-D 790)
B) modulus of elasticity in bending, kg/cm² (ASTM-D 290)
C) impact strength (Charpy), kg.cm/cm² (ASTM-D 256)
D) water absorption of a glass fibre reinforced laminate*), % (ASTM-D 570)
E) heat distortion temperature, °C (ASTM-D 648)

*The laminate is prepared by impregnating a glass fibre mat with the unsaturated polyester resin containing the initiator. The impregnated mat is enclosed between sheets of polyester and excess resin is expressed therefrom until a weight ratio of glass fibre to resin of 30 : 70 is obtained. Curing is effected for 24 hours at room temperature and one additional hour at 100°C.

The characteristics found for the specimens are shown in Table II.

TABLE I

| Characteristics of the unsaturated polyester resin | Examples | | | Comparative Examples | | |
|---|---|---|---|---|---|---|
| | 1 | 2 | 3 | 1 | 2 | 3 |
| Hazen colour | 50 | 50 | 90 | 50 | 50 | 90 |
| Viscosity cps (25°C) | 510 | 520 | 600 | 530 | 540 | 620 |
| Gel time (25°C) | 3'40" | 3'15" | 3'50" | 3'20" | 3'10" | 3'30" |
| S.P.I. gel time¹⁾ | 2'30" | 2'25" | 2'35" | 2'35" | 2'40" | 2'45" |
| Peak exotherm temperature²⁾ (°C) | 164 | 163 | 162 | 165 | 164 | 163 |
| Time to peak exotherm³⁾ | 4'50" | 4'40" | 5' | 4'40" | 4'50" | 4'55" |
| Time for 50% gelation at 65°C (days) | 9 | 7 | 9 | 9 | 8 | 8 |

Remarks: ¹⁾cf. Kirk-Othmer, Encyclopedia of Chemical Technology, Second Edition, Vol. 20 (1969), pp. 808–809; FIG. 5. S.P.I. gel time is the time interval for the temperature to change from 65.5 to 88°C (150 to 190°F) when the bath temperature is 82°C (180° F).
²⁾cf. Kirk-Othmer, ibid., pp. 808 to 813;
³⁾cf. Kirk-Othmer, ibid., p. 809, FIG. 5.

TABLE II

| | Characteristics of the cured polyester resins | | | | |
|---|---|---|---|---|---|
| | A | B | C | D | E |
| Example 1 | 840 | 41 × 10³ | 3.2 | 1.06 | 76 |
| Example 2 | 590 | 45 × 10³ | 2.3 | 1.12 | 72 |
| Example 3 | 750 | 42 × 10³ | 3.6 | 1.31 | 61 |
| Comp. Example 1 | 790 | 41 × 10³ | 2.9 | 1.08 | 74 |
| Comp. Example 2 | 560 | 44 × 10³ | 2.1 | 1.26 | 68 |
| Comp. Example 3 | 700 | 42 × 10³ | 3.4 | 1.28 | 60 |

What we claim is:

1. A process for the continuous production of unsaturated polyesters, which comprises the steps of
   a. bringing olefinically unsaturated dicarboxylic acids or their anhydrides, if desired together with saturated dicarboxylic acids or their anhydrides (dicarboxylic acid component) and dihydric alcohols, if desired together with higher polyhydric alcohols (alcohol component) into contact in molar ratios of from about 1.5:1 to 1.95:1 in a first reaction phase, operating at a temperature of from about 100° to 160°C and with residence times of from about 5 to 40 minutes to cause the formation of a corresponding half-ester;
   b. adding to the half-ester formed a further quantity of the alcohol component in such a way as to give a molar ratio of the dicarboxylic acid component to the total amount of the alcohol component in the range of from about 0.87:1 to 0.97:1;
   c. bringing about the polyesterification in a second reaction phase by treating the product obtained in b) in at least two separate and successive stages, which are operated at decreasing pressure values in the range of from about 5 atmospheres to atmospheric pressure, for a total time of from about 2 to 8 hours, and at temperatures of from about 100° to 220°C, the temperature between said stages not differing by more than about 10°C, the water formed during the polyesterification being eliminated from each of the said stages;
   d. evaporating the residual water and the excess of the alcohol component from the polyesterification product obtained in c) with operation at pressures below atmospheric pressure.

2. The process of claim 1, wherein the polyesterification is carried out in 3 to 4 reaction stages, with a pressure that decreases in the various stages from about 3 to 4 atmospheres to atmospheric pressure.

3. The process of claim 1, wherein the evaporation in step d) is carried out by a thin-film technique at pressures of from about 2 to 50 mmHg and at temperatures not exceeding the polyesterification temperatures.

4. The process of claim 1, wherein as olefinically unsaturated dicarboxylic acid components maleic acid and its anhydride, itaconic or fumaric acid are used.

5. The process of claim 1, wherein as saturated dicarboxylic acid components succinic acid and its anhydride, sebacic acid, phthalic acid and its anhydride, and isophthalic, terephthalic or adipic acid are used.

6. The process of claim 1, wherein as dihydric alcohol components 1,2-propylene glycol, ethylene glycol, diethylene glycol, triethylene glycol, butylene glycol, dipropylene glycol, 1,6-hexanediol or neopentyl glycol are used.

7. The process of claim 1, wherein maleic acid anhydride, phthalic acid anhydride and 1,2-propylene glycol are used.

8. In a process for producing unsaturated polyester mixtures consisting of mixing unsaturated polyesters with at least one polymerizable monomeric acrylic or vinyl compound the improvement which comprises continuously producing said unsaturated polyesters by the steps of:
   a. bringing olefinically unsaturated dicarboxylic acids or their anhydrides, if desired together with saturated dicarboxylic acids or their anhydrides (dicarboxylic acid component) and dihydric alcohols, if desired together with higher polyhydric alcohols (alcohol component) into contact in molar ratios of from about 1.5:1 to 1.95:1 in a first reaction phase, operating at a temperature of from about 100° to 160°C and with residence times of from about 5 to 40 minutes to cause the formation of a corresponding half-ester;

b. adding to the half-ester formed a further quantity of the alcohol component in such a way as to give a molar ratio of the dicarboxylic acid component to the total amount of the alcohol component is the range of from about 0.87:1 to 0.97:1;

c. bringing about the polyesterification in a second reaction phase by the treating the product obtained in b) in at least two separate and successive stages, which are operated at decreasing pressure values in the range of from about 5 atmospheres to atmospheric pressure, for a total time of from about 2 to 8 hours, and at temperatures of from about 100° to 220°C, the temperature between said stages not differing by more than about 10°C, the water formed during the polyesterification being eliminated from each of the said stages;

d. evaporating the residual water and the excess of the alcohol component from the polyesterification product obtained in c) with operation at pressures below atmospheric pressure.

9. The process of claim 8, wherein the monomeric acrylic or vinyl compound is used in a quantity of from about 20 to 60 percent by weight on the unsaturated polyester.

10. The process of claim 9, wherein the monomeric vinyl compound is styrene.

* * * * *